United States Patent
Iizuka et al.

[11] Patent Number: 5,706,270
[45] Date of Patent: Jan. 6, 1998

[54] COMPACT OPTICAL PICK-UP LEAD WITH A VERTICALLY INCLINED SUBSTRATE INTEGRATED WITH LASER SOURCE AND LIGHT DETECTOR

[75] Inventors: Genichi Iizuka, Chiba; Hiroshi Oinoue, Tokyo, both of Japan

[73] Assignee: Sony Corporation, Tokyo, Japan

[21] Appl. No.: 596,379

[22] PCT Filed: Jun. 20, 1995

[86] PCT No.: PCT/JP95/01228

§ 371 Date: Feb. 16, 1996

§ 102(e) Date: Feb. 16, 1996

[87] PCT Pub. No.: WO95/35567

PCT Pub. Date: Dec. 28, 1995

[30] Foreign Application Priority Data

Jun. 20, 1994 [JP] Japan .................. P6-160620
Jun. 20, 1994 [JP] Japan .................. P6-160623

[51] Int. Cl.$^6$ ........................... G11B 7/08
[52] U.S. Cl. ............ 369/112; 369/44.14; 369/44.12; 369/121; 369/44.32
[58] Field of Search ............. 369/44.14, 44.12, 369/44.23, 121, 122, 112, 44.32

[56] References Cited

U.S. PATENT DOCUMENTS 5,406,543  4/1995  Kobayashi et al. .......... 369/121
5,440,533  8/1995  Fujimaki et al. ........... 369/44.14
5,465,242  11/1995  Terashima et al. ......... 369/44.14
5,513,121  4/1996  Sugawara et al. ......... 369/44.14

FOREIGN PATENT DOCUMENTS 3-132932  6/1991  Japan .............. G11B 7/125
3-189932  8/1991  Japan .............. G11B 7/08

Primary Examiner—David C. Nelms
Assistant Examiner—Kim-Kwok Chu
Attorney, Agent, or Firm—Limbach & Limbach L.L.P.; Seong-Kun Oh

[57] ABSTRACT

An optical pick-up device according to the present invention is mounted to a recording and/or reproducing apparatus in which an optical recording medium is employed as a recording medium to write and/or read out information signals on the optical recording medium. By disposing a light-emitting and receiving unit such that the surface of the rectangular substrate is inclined relative to the optical axis of the objective lens, the recording and/or reproducing apparatus having a small thickness can be obtained. Additionally, a first light path-changing member is disposed underneath the objective lens along the optical axis thereof, and a second light path-changing member is provided for changing the light path of the light beam emitted from a light-emitting element such that the optical axis thereof is deflected in the direction normal to an optical axis of the light beam passing between the objective lens and the first light path-changing member such that the light-emitting and receiving unit and the second light path-changing member is disposed in the proximity of a peripheral portion of the objective lens whereby a compactness of the optical pick-up device can be achieved.

23 Claims, 6 Drawing Sheets

COMPACT OPTICAL PICK-UP LEAD WITH A VERTICALLY INCLINED SUBSTRATE INTEGRATED WITH LASER SOURCE AND LIGHT DETECTOR

TECHNICAL FIELD

This invention relates to an optical pick-up device, and more particularly to an optical pick-up device using a light-emitting and receiving unit which includes a light-emitting element and a light-receiving element both formed integrally on a common substrate.

BACKGROUND ART

It is hitherto known that an optical recording medium such as an optical disc is used as a recording medium for a recording and/or reproducing apparatus. In the recording and/or reproducing apparatus of such a type, an optical pick-up device is provided to write and/or read out information signals on the optical recording medium. The optical pick-up device includes a light-emitting element such as a semiconductor laser for emitting a light beam and a light receiving element such as a photodetector. The optical pick-up device has a function for carrying out recording of information signals on the optical recording medium by radiating the light beam thereon, or reproducing of the information signals on the optical recording medium by detecting a returning light reflected on the optical recording medium by the light receiving element.

The optical pick-up device is provided with an objective lens which serves for focusing and radiating a light beam emitted from the light-emitting element on a signal recording surface of the optical recording medium.

Further, the optical pick-up device is provided with an objective lens-driving device for controllably driving the objective lens both in the focusing direction parallel with an optical axis of the objective lens and in the tracking direction normal to the optical axis of the objective lens whereby the signal recording surface of the rotatably operated optical recording medium is allowed to be located at the position in a depth of focus of the light beam radiated through the objective lens and the light beam radiated through the objective lens is permitted to exactly follow recording tracks of the rotatably operated optical recording medium.

Meanwhile, with respect to the recording and/or reproducing apparatus of the type in which an optical recording medium is used, there has been a demand for realizing compactness and thinness of the apparatus. Actually, recording and/or reproducing apparatuses currently used have such a small size as approximately similar to an outer diameter of the optical recording medium to be loaded thereon. In addition, since the optical recording medium is capable of recording information signals with a high density, there has been proposed and employed the recording and/or reproducing apparatus on which the optical recording medium having a size as small as 64 mm or less can be loaded. However, there is still a further demand for compactness and thinness of the recording and/or reproducing apparatus.

In order to realize the compactness and thin thickness of the recording and/or reproducing apparatus, it is necessary to achieve a compactness and a thinness of an optical pick-up device which serves as a means for recording and/or reproducing information signals on the optical recording medium.

For the purpose of achieving the compactness and thinness of the optical pick-up device, known optical pick-up device has, for example, such a structure that the light beam to be radiated on the optical recording medium is first emitted in the direction normal to an optical axis of an objective lens and then deflected by a light path-changing means such as a light-turning mirror to thereby introduce the light beam into the objective lens.

Thus, by emitting the light beam in the direction normal to the optical axis of the objective lens, it becomes possible to reduce a height between the light-emitting element and the objective lens whereby compactness of the optical pick-up device is achievable. Further, another proposal has been made to realize the compactness of the optical pick-up device, in which the light-emitting element for emitting the light beam and a light-receiving element for detecting the returning light reflected on the optical recording medium are disposed on a common substrate to form an integrated light-emitting and receiving unit. The use of such a light-emitting and receiving unit can save or reduce an accommodation space required for providing individual light-emitting and light-receiving elements whereby compactness of the optical pick-up device can be achieved.

Incidentally, in the previously proposed optical pick-up device, the light-emitting and receiving unit is uprightly elected on a base, on which an objective lens-driving device is also mounted, such that the light beam emitted from the light-emitting element proceeds in the direction normal to the optical axis of the objective lens. However, the upright arrangement of the light-emitting and receiving unit on the base makes it difficult to obtain the optical pick-up device having a thin thickness, because reduction of the thickness is prohibited by the height of the light-emitting and receiving unit uprightly disposed on the base.

DISCLOSURE OF THE INVENTION

Therefore, an object of the present invention is to provide an optical pick-up device having a further compact size and thinned thickness whereby compactness and thinness of an recording and/or reproducing apparatus employing an optical recording medium can be achieved.

In one aspect of the present invention, the optical pick-up device comprises a light-emitting and receiving unit composed of a light-emitting element and a light-receiving element both provided on one side surface of a rectangular substrate, an objective lens for focusing a light beam emitted from the light-emitting element at a point existing along an optical axis thereof, and a light path-changing means for directing the light beam emitted from the light-emitting element toward the objective lens and introducing an incident light entering through the objective lens into the light-receiving element. The light-emitting and receiving unit is so disposed that the one side surface of the rectangular substrate is inclined relative to the optical axis of the objective lens.

In the optical pick-up device of the present invention, the light path-changing means may include a first light path-changing member disposed underneath the objective lens along the optical axis thereof, and a second light path-changing member for deflecting the light beam emitted from the light-emitting element such that the optical axis of the deflected light beam extends in the direction normal to the optical axis of the light beam passing between the objective lens and the first light path-changing member.

In another aspect of the present invention, the optical pick-up device further comprises a supporting mechanism for supporting the objective lens such that the objective lens is movable in the directions both parallel with and normal to the optical axis of the objective lens, and a base to which the light-emitting and receiving unit, the supporting mechanism and the light path-changing means are mounted and which is formed with a guidable support member engaging with a linear guide means. The light-emitting and receiving unit of the optical pick-up device is so disposed on the base that one of a pair of opposed longitudinal sides of the rectangular substrate extends in the direction approximately normal to the optical axis of the objective lens, and a surface of the rectangular substrate is inclined relative to the optical axis of the objective lens.

The supporting mechanism is provided with a reference portion for movement of the objective lens, which is located at a position spaced from the objective lens in the direction normal to the linear guide means. The objective lens is supported so as to be movable in the directions parallel with and normal to the optical axis of the objective lens.

In the optical pick-up device according to the present invention, the light-emitting element and the light-receiving element are disposed on either one of opposite surfaces of the rectangular substrate. The light-emitting and receiving unit is so arranged that the flat surface of the rectangular substrate is inclined relative to the optical axis of the objective lens whereby the optical pick-up device having a thin thickness can be realized without being limited by a height of the substrate of the light-emitting and receiving unit.

Further, in the optical pick-up device according to the present invention, in addition to the special arrangement in which the flat surface of the substrate of the light-emitting and receiving unit is inclined relative to the optical axis of the objective lens, there is provided the light path-changing means for directing the light beam emitted from the light-emitting element of the light-emitting and receiving unit toward the objective lens and introducing the incident light beam entering through the objective lens toward the light-receiving element of the light-emitting and receiving unit. The light path-changing means further includes the first light path-changing member disposed underneath the objective lens along the optical axis thereof, and the second light path-changing member for deflecting the light beam emitted from the light-emitting element such that the optical axis of the deflected light beam extends in the direction normal to the optical axis of the light beam passing between the objective lens and the first light path-changing member. As a result, a distance between the light-emitting and receiving unit and the objective lens is reduced whereby compactness of the optical pick-up device can be achieved in addition to thinness thereof.

Further and additional objects and advantages of the present invention will become more apparent from the following description concerning the preferred embodiments with reference to the accompanying drawings.

BEST MODE OF CARRYING OUT THE INVENTION

The optical pick-up device according to the present invention is described hereinafter by referring to the accompanying drawings.

Figure 1:
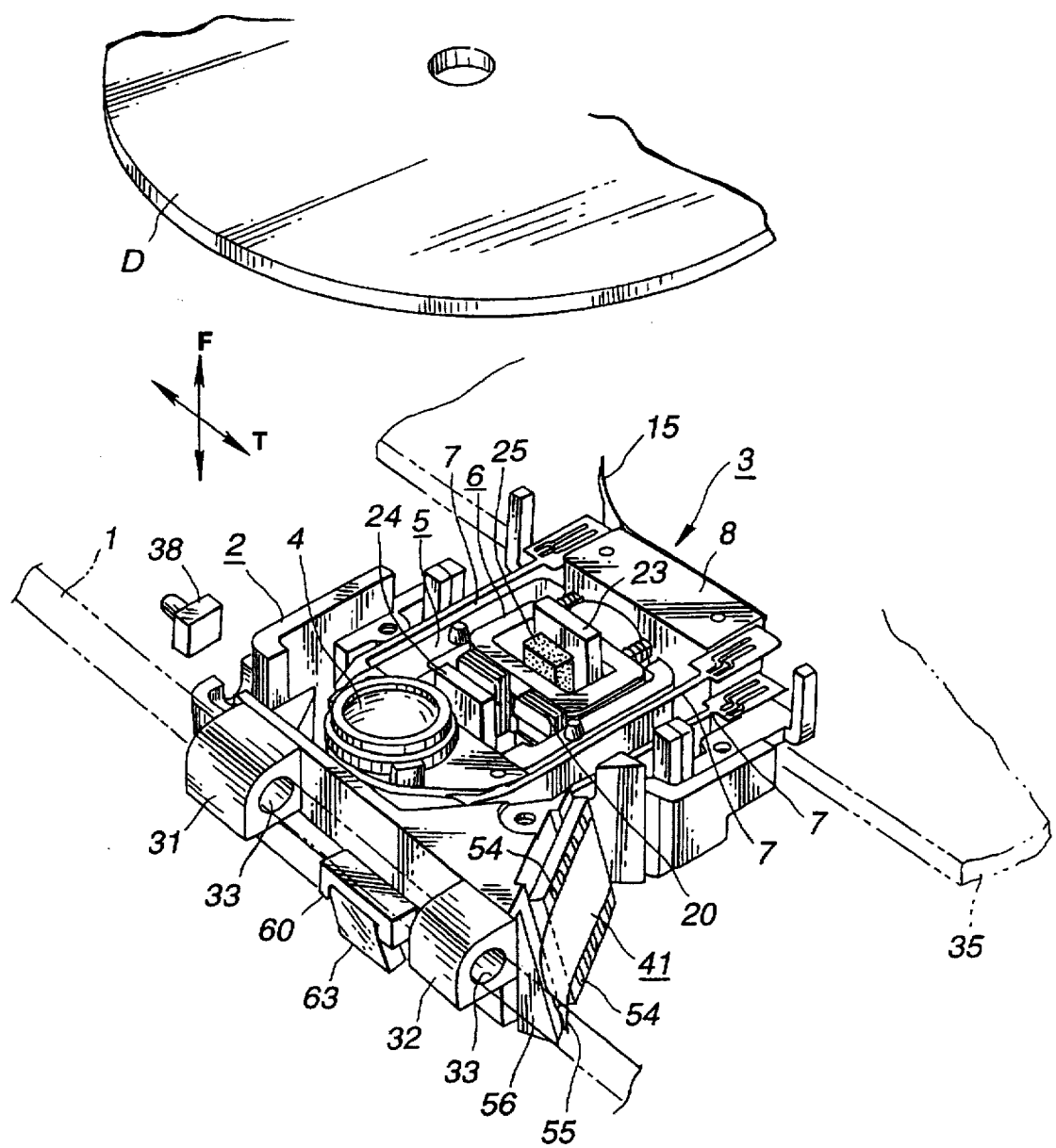
FIG. 1 is a perspective view showing an optical pick-up device according to a first embodiment of the present invention.
Figure 2:
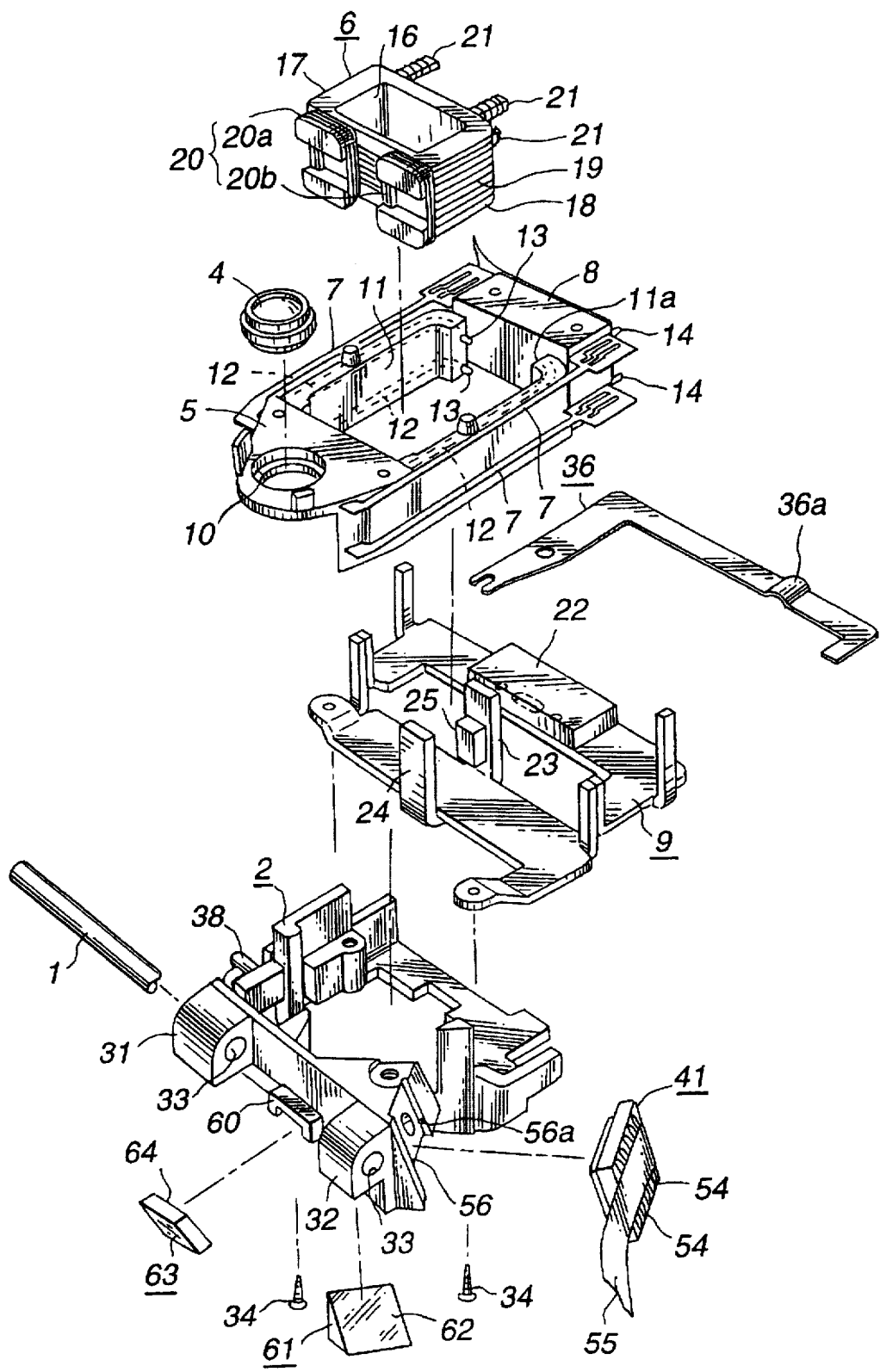
FIG. 2 is an exploded perspective view of the optical pickup device shown in FIG. 1.

The optical pick-up device of the present invention is so designed as to be incorporated into a disc recording and/or reproducing apparatus in which an optical disc is used as a recording medium. As shown in FIGS. 1 and 2, the optical pick-up device includes a base 2 guidably supported on a linear guide shaft 1 provided in the recording and/or reproducing apparatus and an objective-lens driving device 3 mounted on the base 2. The base 2 is movable in the radial direction of the optical disc D loaded in the recording and/or reproducing apparatus an entire radial distance thereof.

The objective-lens driving device 3 used in the optical pick-up device of the present invention is now explained below. As shown in FIGS. 1 and 2, the objective-lens driving device 3 is composed of a lens holder 5 to which an objective lens 4 is securely mounted, a coil bobbin 8, a plurality of resilient support members 7 which supports the lens holder 5 on a front side thereof, a stationary member 8 to which a rear base portion of each of the resilient support members 7 is fixedly coupled, and a support plate 9 on which the stationary member 8 is securely supported.

The lens holder 5 is provided at a free end thereof with an opening 10 into which the objective lens 4 is securely fitted. Further, the lens holder 5 is provided at the other end thereof with another opening 11 into which the coil bobbin 8 is securely fitted.

The objective lens 4 mounted to the lens holder 5 is made of glass or a light-permeable synthetic resin which is shaped into a single-eye lens having non-spherical side surfaces.

Meanwhile, the lens holder 5 is formed of a molded synthetic resin and integrated with four resilient support members 7 which resiliently supports the lens holder 5 so as to permit the lens holder 5 to move in the directions both parallel and normal to an optical axis of the objective lens 4. Each of these resilient support members 7 may be produced by stamping a flexible and electrically conductive sheet metal material such as phosphor bronze, stainless steel, etc., into an elongated strip plate. The four resilient support members 7 are so arranged that each pair of resilient support members is disposed in parallel with each other on both sides of the lens holder 5. Each of the resilient support members 7 has a front side portion fixed to respective opposite sides of a body portion of the lens holder 5 to which the objective lens 4 and the coil bobbin 6 are mounted and in which a center of gravity thereof exists, and the base portion secured to the stationary member 8 mounted on the support plate 9.

That is, the lens holder 5 and the stationary member 8 are integrally connected with each other through the four resilient support members 7 which are disposed in parallel with each other and coupled at the front side portion thereof with the lens holder 5 and at the rear base portion thereof with the stationary member 8 by using an out-sert molding method.

Thus, the rear base portion of each of the resilient support members 7 is secured to the stationary member 8 mounted on the support plate 9 while the elongated strip-like front side portion of each of the resilient support members 7 is secured to the opposite sides of the lens holder 5 so that the lens holder 5 is supported in such a manner as being flexibly movable in both the directions parallel with the optical axis of the objective lens 4 mounted to the lens holder 5 (in the focusing direction indicated by an arrow F in FIG. 1) and normal to the optical axis of the objective lens 4 (in the tracking direction indicated by an arrow T in FIG. 1).

Further, each of the resilient support members 7 is formed integrally with an inner folded arm portion 12 extending from the front distal end toward the rear base portion thereof in parallel with the elongated strip-like front side portion thereof. The inner folded arm portions are embedded into the opposite sides of the lens holder 5 and have connecting end portions 13 which serve for electrical connection with terminals of the coil bobbin 6 received in the opening 11 of the lens holder 5, as described hereinafter. The connecting end portions 13 are projected into a recess 11a formed on a portion of an inner wall which defines the opening 11, as shown in FIG. 2.

Meanwhile, an end portion of the rear base portion of each resilient support member 7 is so disposed as to project from a rear side surface of the stationary member 8 backwardly to provide an input terminal 14 at which a focusing drive signal and a tracking drive signal from a servo circuit (not shown) are entered. These input terminals 14 are connected with a flexible printed circuit board 15 derived from the servo circuit.

The coil bobbin 6 mounted to the lens holder 5 is formed of a molded synthetic resin which is an electrically insulating material. As shown in FIG. 2, the coil bobbin 6 is of a rectangular cylindrical shape having a rectangular through-hole 16 at a central portion thereof and has an outer size capable of being received in the opening 11 formed through the lens holder 5. The coil bobbin 6 is provided at upper and lower ends thereof with upper and lower flanges 17 and 18, respectively. A focusing coil 19 is wound on a portion between the upper and lower flanges of the coil bobbin 6. Specifically, the focusing coil 19 is wound on an outer circumferential surface of the portion extending between the upper and lower flanges 17 and 18 along the direction of the optical axis of the objective lens 4 so that the winding of the focusing coil 19 is of a cylindrical shape. The focusing coil 19 is provided at a side portion thereof with a pair of coiled portions 20a and 20b each having a flat rectangular shape and connected together to constitute a tracking coil 20. The coiled portions 20a and 20b of the tracking coil 20 are formed from a continuously wound thin wire.

In a rear side portion of the coil bobbin 6 opposed to the portion where the tracking coil 20 is provided, a pair of terminal pins 21 are projected from each of the upper and lower flanges 17 and 18. Leading and trailing ends of each of the focusing and tracking coils 19 and 20 are wound on the respective terminal pins 21.

The coil bobbin 8 as constructed above are inserted and received into the opening 11 of the lens holder 5 such that the respective terminal pins 21 are located in the recess 11a. In this condition, the coil bobbin 6 may be fixed to the lens holder 5 by using an adhesive, if desired. Further, the respective terminal pins 21 of the coil bobbin 6 is electrically connected to the connecting end portions 13 of the resilient support members 7 which support the lens holder 5, by soldering or using a conductive adhesive. By connecting the respective terminal pins 21 with the connecting end portions of the resilient support members 7, the focusing and tracking coils 19 and 20 are electrically coupled with the servo circuit through the plural conductive resilient support members 7 and the flexible printed circuit board 15 connected thereto.

The support plate 9, on which the stationary member 8 supporting the lens holder 5 through a plurality of resilient support members 7 is mounted and which constitutes a magnetic circuit section of the objective-lens driving device 3, is formed of a magnetic material having a high rigidity, such as metal. The support plate 9 is provided at a rear portion thereof with a mounting block 22 on which the stationary member 8 is mounted, and at a front portion thereof with a pair of opposed yokes 23 and 24 uprightly extending from a the front portion of the support plate 9. A magnet 25 is secured onto an inner surface of the one yoke 23 such that a magnetic gap is formed between the magnet 25 and the other yoke 24.

As shown in FIG. 1, the stationary member 8 is mounted on the mounting portion 22 provided on the support plate 9, to dispose the lens holder 5 on the support plate 9 whereby a complete objective-lens driving device 3 is assembled.

Meanwhile, the assembling of the lens holder 5 on the support plate 9 is performed such that the focusing and tracking coils 19 and 20 of the coil bobbin 6 mounted on the lens holder 5 are inserted into the magnetic gap formed between the magnet 25 and the other yoke 24. At this time, the stationary member 8, which is coupled with the rear base portion of each of the resilient support members 7 supporting the lens holder 5, is secured to the mounting portion 22 of the support plate 9 by using an adhesive or the like.

The base 2, to which the above-constructed objective-lens driving device 3 is mounted, is made of die-cast aluminum or a molded synthetic resin and provided on one side thereof with a pair of guide blocks 31 and 32 formed integrally therewith and serving as a support for supporting the base 2 on the linear guide shaft 1. The guide blocks 31 and 32 are formed with through holes 33 having center axes exactly aligned with each other.

As shown in FIG. 1, the objective-lens driving device 3 is mounted on the base 2 such that the objective lens 4 thereof is located on the side where a pair of the guide blocks 31 and 32 are provided, and the plural resilient support members 7 supporting the lens holder 5 extend in the direction perpendicular to the axial direction of the linear guide shaft 1 which extends through the guide blocks 31 and 32. The objective-lens driving device 8 is fixed onto the base 2 by fastening bolts 34 which are screwed through a portion of the support plate 9 into the base 2. On the side opposed to the side where the guide blocks 31 and 32 are formed, the objective-lens driving device 3 is provided with a plate spring 36 which cooperates with the support plate 9 constituting a portion of the objective-lens device 3 so as to interpose therebetween a slide guide member 35 formed within the recording and/or reproducing apparatus. The plate spring 36 is of an approximate L-shape and has one end portion opposed to the rear portion of the support plate 9 and extending in the direction of the axis of the linear guide shaft 1 which extends through the guide blocks 31 and 32. The plate spring 36 is fixed to the base 2 by one of the fastening bolts 34 which serve for securing the support plate 9 to the base 2.

Incidentally, the plate spring 36 is formed at the middle thereof with an arcuate swelled portion 36a at which the plate spring comes into pressure contact with a point of the slide guide member 35.

The base 2, on which the objective-lens driving device 3 is mounted, is disposed within the recording and/or reproducing apparatus such that the linear guide shaft 1 is inserted into and engaged with the through-holes 33 of the guide blocks 31 and 32 and one side portion of the slide guide member 35 is interposed between the plate spring 36 and the support plate 9. The base 2 is so operated as to move in the radial direction of the optical disc D while being guided along the linear guide shaft 1 by means of a drive motor (not shown) and a gear drive mechanism (also not shown) for transmitting a driving force of the drive motor.

Provided on the base 2 is a light-emitting and receiving unit 41 which is composed integrally of a light-emitting element for emitting a light beam to be radiated to a signal-recording or carrying surface of the optical disc D through the objective lens 4, and a light-receiving element for receiving a returning light reflected on the signal-recording or carrying surface of the optical disc D.

Figure 3:
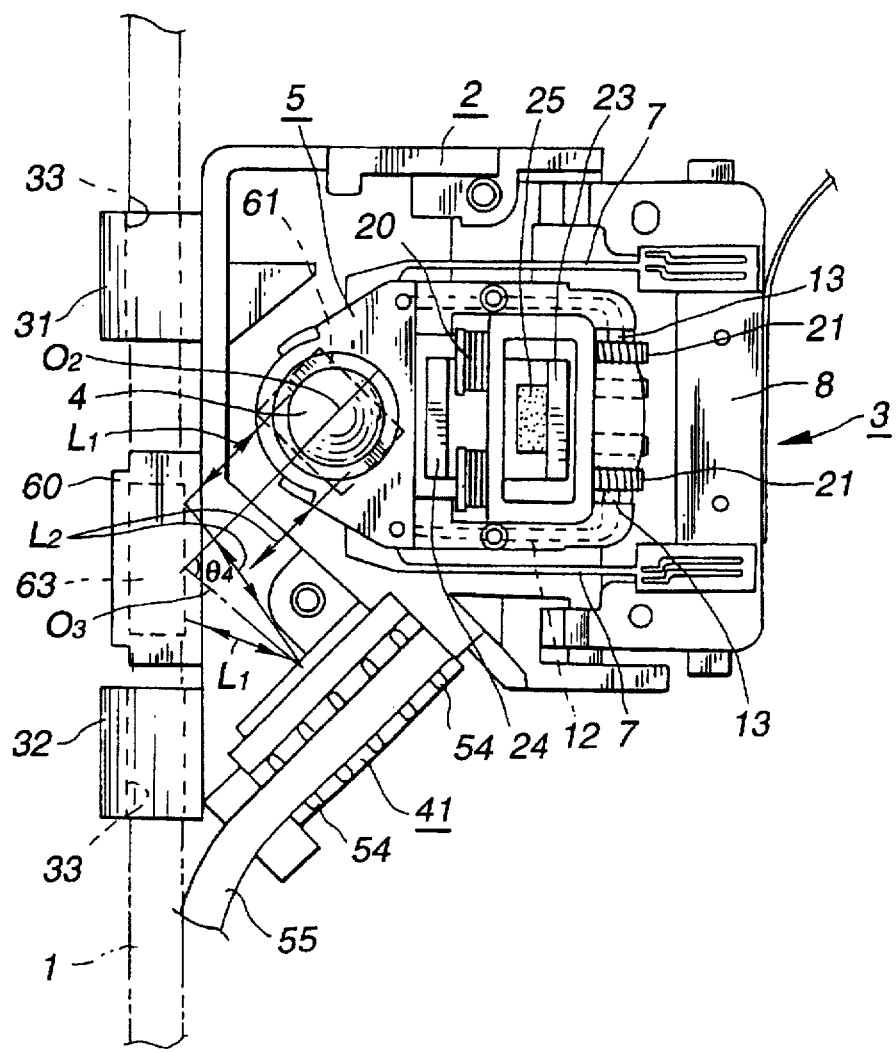
FIG. 3 is a top plan view of the optical pick-up device shown in FIG. 1.
Figure 4:
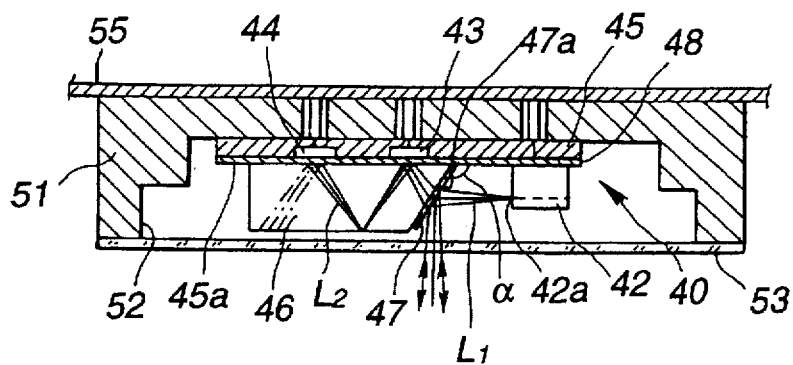
FIG. 4 is a sectional view showing a light-emitting and receiving unit employed in the optical pick-up device according to the present invention.

As shown in FIGS. 3 and 4, the light-emitting and receiving unit 41 includes a light-emitting and receiving composite element 40 which is composed of a semiconductor laser 42 constituting the light-emitting element for emitting a light beam to be radiated to the signal-recording or carrying surface of the optical disc D, and first and second photodetectors 43 and 44 constituting the light-receiving element for receiving the returning light reflected on the signal-recording or carrying surface of the optical disc D. The semiconductor laser 42 and the photodetectors 43 and 44 are integrated on a common semiconductor substrate 45. On one side surface 45a of the semiconductor substrate 45 of the composite element 40, the first and second photodetectors 43 and 44 are disposed in parallel with each other. Further, on the surface 45a of the semiconductor substrate 45, the semiconductor laser 42 is also disposed in parallel with the first and second photodetectors 43 and 44.

Each of the first and second photodetectors 43 and 44 is divided into a plurality of light-receiving areas. These photodetectors 43 and 44 can transmit an output signal such as a focusing error signal, a tracking error signal and a reproducing signal indicative of information recorded on the optical disc D on the basis of addition or subtraction of outputs obtained by detecting the returning light reflected on the optical disc D by the respective areas of the photodetectors 43 and 44.

The semiconductor laser 42 is mounted on the surface 45a of the semiconductor substrate 45 such that a light-emitting surface 42a thereof for emitting a light beam $L_1$ extends in the direction perpendicular to the surface 45a of the semiconductor substrate 45 and is directed toward the side where the first and second photodetectors 43 and 44 are disposed. Accordingly, the light beam $L_1$ is emitted from the light-emitting surface 42a of the semiconductor laser 42 such that the optical axis thereof extends in the direction parallel with the surface of the semiconductor substrate 45.

In addition, the semiconductor laser 42 and the first and second photodetectors 48 and 44 disposed in parallel on the surface 45a of the semiconductor substrate 45 are arranged in line in the direction parallel with the optical axis of the light beam $L_1$ emitted from the semiconductor laser 42. Thus, the semiconductor substrate 45 having thereon the linear parallel arrangement of the semiconductor laser 42 and the first and second photodetectors 43 and 44 is shaped into a rectangular plate which has a longitudinal side extending in the direction of the linear arrangement of the semiconductor laser 42 and the first and second photodetectors 48 and 44.

Furthermore, on the surface 45a of the semiconductor substrate 45, there is provided a prism 46 which is disposed over the first and second photodetectors 43 and 44 in an opposed relation with the light-emitting surface 42a of the semiconductor laser 42. The prism 46 reflects the light beam $L_1$ emitted from the semiconductor laser 42 and directs it outwardly from the light-emitting and receiving unit 41. The prism 46 also has a function to receive an incident returning light $L_2$ reflected on the optical disc D and to cause the returning light $L_2$ to pass therethrough toward the first and second photodetectors 43 and 44. To this end, the prism 46 is provided, at the side opposed to the semiconductor laser 42, with a reflecting membrane 47 formed as a semipermeable membrane which is capable of reflecting the light beam $L_1$ emitted from the semiconductor laser 42 to direct it toward the outside of the light-emitting and receiving unit 41, and introducing the incident returning light $L_2$ reflected on the optical disc D and then deflected, into the inside of the prism 46. In order to cause the light beam $L_1$ emitted from the semiconductor laser 42 to reflect in the direction perpendicular to one surface of the semiconductor substrate 45, the reflecting membrane 47 has a surface 47a disposed at an inclined angle $\alpha$ of 45 degrees relative to the optical axis of the light beam $L_1$ emitted from the semiconductor laser 42.

Incidentally, the first and second photodetectors 43 and 44 are covered with a protecting layer 48. Accordingly, the semiconductor laser 42 and the prism 46 are disposed on the surface 45a of the semiconductor substrate 45 through the protecting layer 48.

Figure 5:
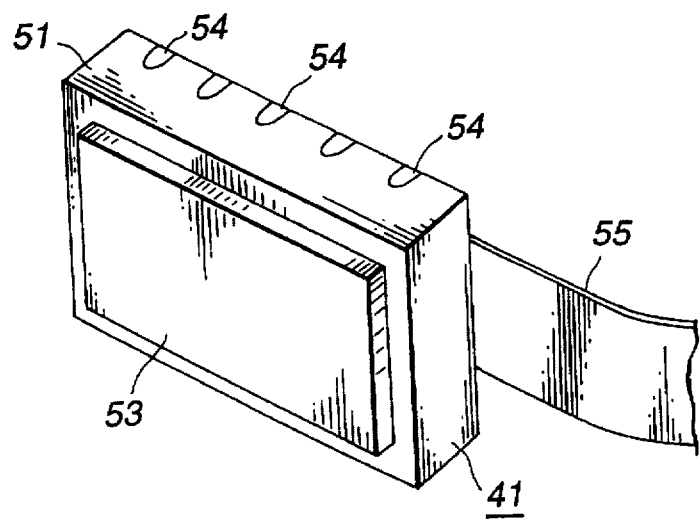
FIG. 5 is a perspective view showing an outer appearance of the light-emitting and receiving unit.

As mentioned above, the semiconductor laser 42, the first and second photodetectors 43 and 44 and the prism 46 are arranged on the semiconductor substrate 45 to constitute an integral light-emitting and receiving unit 40. This construction makes it possible that the integrated light-emitting and receiving unit 40 is encapsulated in a package 51 used for enclosing semiconductors. As shown in FIG. 5, the package 51 is of a box-like shape having a front opening 52 and a size corresponding to the rectangular shape of the semiconductor substrate 45. In addition, as shown in FIG. 4, the light-emitting and receiving composite element 40 is accommodated in the package 51 such that the surface 45a of the semiconductor substrate 45 is opposed to the front opening 52 of the package 51. In this condition, the flat surface 45a of the semiconductor substrate 45 is disposed in parallel with the opened front face of the package 51. The front opening 52 of the package 51 is sealingly covered with a light-permeable plate 53 made of a material such as glass, etc., which is capable of permeating the light beam $L_1$ emitted from the semiconductor laser 42 and the returning light $L_2$ from the optical disc D without deflection thereof. The front surface of the package 51 where the light-permeable plate 53 is fitted, serves as a light-emission surface and a light-incidence surface for the light beam $L_1$ and the returning light $L_2$, respectively.

The package 51 is provided with a plurality of terminals 54 to which a wiring pattern formed on the light-emitting and receiving composite element 40 is connected and through which the flexible printed circuit board 55 is connected with the composite element 40 to supply an electrical driving current to the semiconductor laser 42 and to cause the first and second photodetectors 43 and 44 to transmit their detection signals.

The above-mentioned light-emitting and receiving unit 41 composed of the package 51 and the light-emitting and receiving composite element 40 accommodated therein is mounted on a unit-fitting portion 56 formed on an upright wall perpendicular to the side of the base 2 where a pair of the guide blocks 31 and 32 are provided. As shown in FIGS. 1 and 2, the unit-fitting portion 56 is formed on the base 2 in such a manner that a surface of the unit-fitting portion 56 to which the front surface of the light-emitting and receiving unit 41 is opposed, is inclined in the axial direction of the linear guide shaft 1 which extends through the guide blocks 31 and 32.

The unit-fitting portion 56 is formed with an opening 56a opened to the surface thereof to which the front surface of the light-emitting and receiving unit 41 is oppositely fitted. The opening 56a serves to cause the light beam $L_1$ emitted from the light-emitting and receiving unit 41 and the returning light $L_2$ reflected on the optical disc D to pass therethrough.

Figure 6:
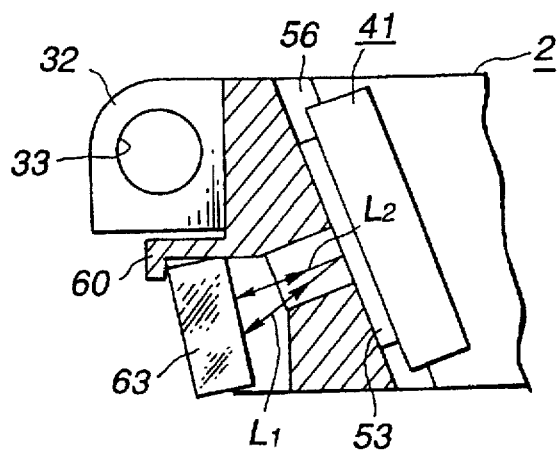
FIG. 6 is a sectional view showing a condition in which the light-emitting and receiving unit is mounted on a base.
Figure 7:
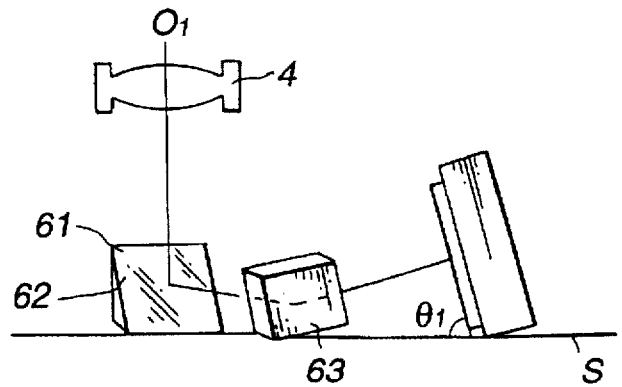
FIG. 7 is a side view showing a relation of arrangement between the light-emitting and receiving unit and an objective lens.

As shown in FIG. 2, the unit-fitting portion 56 is inclined toward the bottom of the base 2. In addition, as shown in FIG. 6, the light-emitting and receiving unit 41 is mounted on the unit-fitting portion 56 such that the front surface of the unit 41, on which the light-permeable plate 53 serving as the light emission and incidence surface for the light beam $L_1$ and the returning light $L_2$ is provided, is opposed to the base 2. The peripheral portion of the package 51 is adhered to the unit-fitting portion 56. The light-emitting and receiving unit 41 thus mounted on the unit-fitting portion 56 inclined toward the base 2 is arranged such that the surface 45a of the semiconductor substrate 45 namely the front surface of the package 51 on which the semiconductor laser 42 and the first and second photodetectors 43 and 44 are mounted, is inclined at an angle of less than 90 degrees relative to an optical axis $O_1$ of the objective lens 4 mounted to the objective-lens driving device 3 on the base 2. Specifically, as shown in FIG. 7, the light-emitting and receiving unit 41 is fixed onto the base 2 such that the front surface of the package 51 makes an angle $\theta_1$ of 74 degrees relative to a plane S normal to the optical axis $O_1$ of the objective lens 4.

In addition, the light emitting and receiving unit 41 is mounted on the unit-fitting portion 56 such that the optical axis of the light beam $L_1$ emitted from the semiconductor laser 42 extends in the direction parallel with a primary plane of the base 2. That is, as shown in FIGS. 1 and 3, the light-emitting and receiving unit 41 is fixed onto the base 2 in such a manner that the longitudinal side of the rectangular semiconductor substrate 45 along the direction in which the semiconductor laser 42 and the first and second photodetectors 43 and 44 are disposed in parallel and in line, namely along the longitudinal direction of the package 51, is approximately normal to the optical axis $O_1$ of the objective lens 4.

Figure 8:
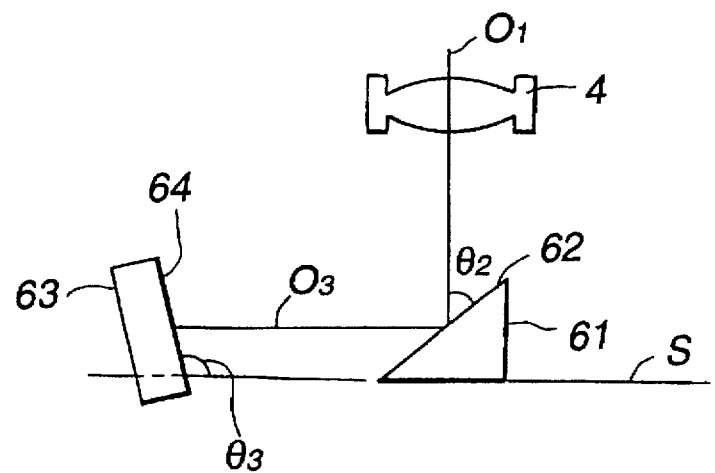
FIG. 8 is a side view showing a relation of arrangement between first and second light-turning mirrors and the objective lens.

The base 2, on which the objective-lens driving device 3 is disposed, is provided thereon with a first light-turning mirror 61 which constitutes a light path-changing means for directing the light beam $L_1$ emitted from the light-emitting and receiving unit 41 toward the objective lens 4 and introducing the returning light $L_2$ reflected on the optical disc D and entering through the objective lens 4 into the light-emitting and receiving unit 41. As shown in FIGS. 2 and 8, the first light-turning mirror 61 is mounted on the base 2 on the under side of the objective lens 4 along the optical axis $O_f$ thereof. As shown in FIG. 8, the first light-turning mirror 61 is of an approximately triangular shape in section and has a reflecting surface 62 which is so disposed on the under side of the objective lens 4 as to incline at an angle $\theta_2$ of 45 degrees relative to the optical axis $O_1$ of the objective lens 4.

Further, the base 2 is provided thereon with a second light-turning mirror 63 having a reflecting surface 64 on which the light beam $L_1$ emitted from the light-emitting and receiving unit 41 is reflected to be directed toward the reflecting surface 62 of the first light-turning mirror 61 and on which the returning light $L_2$ reflected on the reflecting surface 62 of the first light-turning mirror 61 is also reflected to proceed toward the light-emitting and receiving unit 41 so as to be incident thereupon. This second light-turning mirror 63 is in the form of a flat mirror and disposed on the side where a pair of the guide blocks 31 and 32 of the base 2 are provided. That is, the second light-turning mirror 63 is fixedly adhered to a mirror-fitting portion 60 formed between the guide blocks 31 and 32.

Meanwhile, as mentioned above, the light-emitting and receiving unit 41 is mounted on the base 2 such that the surface 45a of the semiconductor substrate 45, on which the semiconductor laser 42 and the first and second photodetectors 43 and 44 are provided, is inclined at an angle of less than 90 degrees relative to the optical axis $O_1$ of the objective lens 4, namely at an angle $\theta_1$ of less than 90 degrees relative to the plane S normal to the optical axis $O_1$ of the objective lens 4. As a result, the light beam $L_1$ is emitted from the light-emitting and receiving unit 41 in such a direction that the optical axis of the light beam $L_1$ is inclined relative to the plane perpendicular to the optical axis $O_1$ of the objective lens 4 at an angle corresponding to the inclined angle of the light-emitting and receiving unit 41 relative to the optical axis $O_1$ of the objective lens 4. Further, the first light-turning mirror 61 is located in a position through which the optical axis $O_1$ of the objective lens 4 extends. Furthermore, the reflecting surface 62 of the first light-turning mirror 61 is so disposed as to incline at an angle of 45 degrees relative to the optical axis $O_1$ of the objective lens 4. In order for the light beam $L_1$ to be incident upon the objective lens 4 through the first light-turning mirror 61, it is required that the optical axis of light beam $L_1$ incident upon the reflecting surface 62 of the first light-turning mirror 61 extend in the direction normal to the optical axis of the light beam passing between objective lens 4 and the first light-turning mirror 61.

Therefore, as shown in FIG. 8, the second light-turning mirror 63 is mounted on the base 2 such that the reflecting surface 64 thereof is inclined in the direction reverse to the inclination of the light-emitting and receiving unit 41. That is, the second light-turning mirror 63 is so arranged on the base 2 that the reflecting surface 64 thereof makes an angle $\theta_3$ of 106 degrees relative to the plane S normal to the optical axis $O_1$ of the objective lens 4 but the direction of the inclination of the second light-turning mirror 63 is reverse to that of the light-emitting and receiving unit 41. By mounting the second light-turning mirror 63 on the base 2 in such an inclined manner, the optical axis of the light beam $L_1$ emitted from the light-emitting and receiving unit 41 is deflected toward the direction normal to the optical axis of the light beam passing between the objective lens 4 and the first light-turning mirror 61 by the reflection on the second light-turning mirror 63 and then the light beam $L_1$ so deflected is incident upon the first light-turning mirror 61. Thereafter, the light beam $L_1$ is reflected on the reflecting surface 62 of the first light-turning mirror 61 to proceed in the direction parallel with the optical axis $O_1$ of the objective lens 4 and then is incident upon the objective lens 4.

On the other hand, the returning light $L_2$ reflected on the optical disc D passes through the objective lens 4 and then proceeds in the direction parallel with the optical axis of the light beam passing between the objective lens 4 and the first light-turning mirror 61 to be incident on the first light-turning mirror 61. Upon reflection on the reflecting surface 62 of the first light-turning mirror 61, the returning light $L_2$ is deflected in the direction normal to the optical axis of the light beam passing between the objective lens 4 and the first light-turning mirror 61 and then incident upon the second light-turning mirror 63. Thus, the returning light $L_2$ reflected on the first light-turning mirror 61, which has an optical axis extending normal to the optical axis of the light beam passing between the objective lens 4 and the first light-turning mirror 61, proceeds toward the reflecting surface 64 of the second light-turning mirror 63 which is disposed on the base 2 at such an angle $\theta_3$ as being inclined in the direction reverse to the inclination of the light-emitting and receiving unit 41. After being reflected on the reflecting surface 64 of the second light-turning mirror 63, the returning light $L_2$ is incident upon the inclined light-emitting and receiving unit 41 such that the optical axis of the returning light $L_2$ extends in the direction normal to the light-emission and light-incidence surface thereof. In other words, the returning light $L_2$ is incident on the interior of the light-emitting and receiving unit 41 in the direction normal to the direction in which the semiconductor laser 42 and the first and second photodetectors 43 and 44 are arranged in line. The incident returning light $L_2$ entering into the light-emitting and receiving unit 41 permeates the reflecting membrane 47 and is then introduced into an interior of the prism 46, and then reaches the first and second photodetectors 43 and 44 while being reflected within the prism 46 whereby the returning light $L_2$ is detected by the first and second photodetectors 43 and 44.

Figure 9:
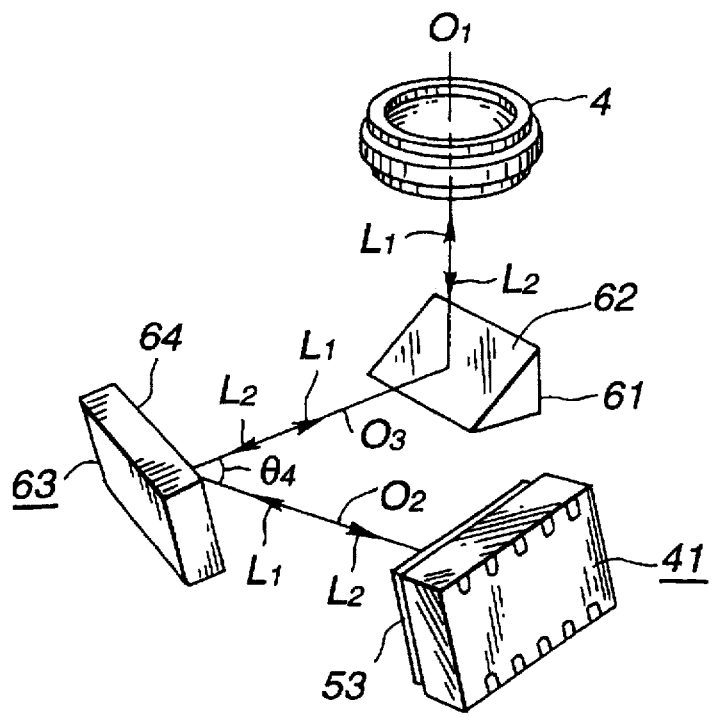
FIG. 9 is a perspective view showing a relation of arrangement between the light-emitting and receiving unit, the first and second light-turning mirrors and the objective lens.

Incidentally, as shown in FIGS. 3 and 9, the second light-turning mirror 63 is so arranged that the common optical axis $O_2$ of the light beam $L_1$ and the returning light $L_2$ which proceed in an area between the light-emitting and receiving unit 41 and the reflecting surface 64 of the second light-turning mirror 63, makes an angle $\theta_4$ of 90 degrees (a right angle) relative to the common optical axis $O_3$ of the light beams $L_1$ and the returning light $L_2$ which proceed in an area between the respective reflecting surfaces 62 and 64 of the first and second light-turning mirrors 61 and 63. That is, the second light-turning mirror 63 is so disposed on the base 2 that the reflecting surface 64 thereof is inclined at such an angle that the optical axis $O_2$ of the light beam $L_1$ emitted from the light-emitting and receiving unit 41 is reflected thereon at a deflection angle of 90 degrees and the optical axis $O_3$ of the returning light $L_2$ reflected on the reflecting surface 62 of the first light-turning mirror 61 is also reflected thereon at a deflection angle of 90 degrees.

As mentioned above, since the optical pick-up device according to the preferred embodiment of the present invention includes the light-emitting and receiving unit 41 in which the semiconductor laser 42 and the first and second photodetectors 43 and 44 are integrally incorporated and which is mounted on the base 2 in an inclined relation with the optical axis $O_1$ of the objective lens 4, an installation height of the light-emitting and receiving unit 41 is considerably reduced whereby a recording and/or reproducing apparatus of a further thin-flat type can be obtained.

In addition to the inclined arrangement of the light-emitting and receiving unit 41 on the base 2, the optical pick-up device according to the preferred embodiment of the present invention includes the first and second light-turning mirrors 61 and 63 on which each of the optical axes of the light beam $L_1$ emitted from the light-emitting and receiving unit 41 and the returning light $L_2$ reflected on the optical disc D is deflected two times. Further, since the second light-turning mirror 63 is so arranged that the common optical axis $O_2$ of the light beam $L_1$ and the returning light $L_2$ which proceed in the area between the light-emitting and receiving unit 41 and the second light-turning mirror 63, makes an angle $\theta_4$ of 90 degrees (a right angle) relative to the common optical axis $O_3$ of the light beam $L_1$ and the returning light $L_2$ which proceed in an area between the second light-turning mirror 63 and the first light-turning mirror 61, the light-emitting and receiving unit 41 and the second light-turning mirror 63 are disposed in a position close or adjacent to the objective lens 4, as shown in FIGS. 3 and 9. This leads to achieving a compactness of the optical pick-up device.

Moreover, the second light-turning mirror 63 is disposed on the side where the guide blocks 31 and 32 supported on the linear guide shaft 1 are provided, so that the second light-turning mirror 63 can be therefore located underneath the linear guide shaft 1 to avoid interference therewith. As a result, a further compactness of the optical pick-up device can be achieved.

Meanwhile, in the optical pick-up device according to the above-mentioned preferred embodiment of the present invention, the objective lens-driving device 3 can be covered with a cover member (not shown). This cover member is formed with an opening through which the objective lens 4 is exposed to the outside. As shown in FIG. 1, in a position to which an outer end surface of the guide block 31 formed on the base 2 is opposed, there is disposed a detection switch 38 for detecting a position of the optical pick-up device when the device is caused to move in the radial direction of the optical disc D loaded in the recording and/or reproducing apparatus.

Although, in the preferred embodiment illustrated above, the light beam $L_1$ emitted from the light-emitting and receiving unit 41 is incident upon the objective lens 4 by using the first and second light-turning mirrors 61 and 63, the second light-turning mirror 63 can be eliminated to thereby achieve the optical pick-up device of a still further thin-flat type.

Figure 10:
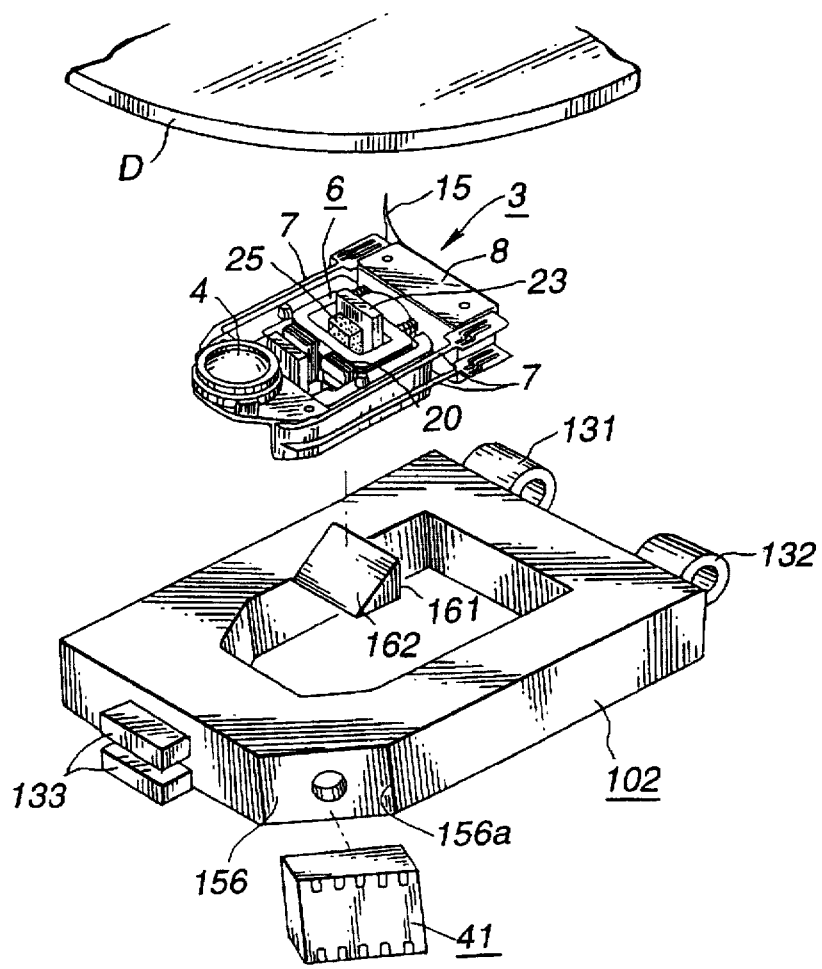
FIG. 10 is an exploded perspective view showing an optical pick-up device according to a second embodiment of the present invention.
Figure 11:
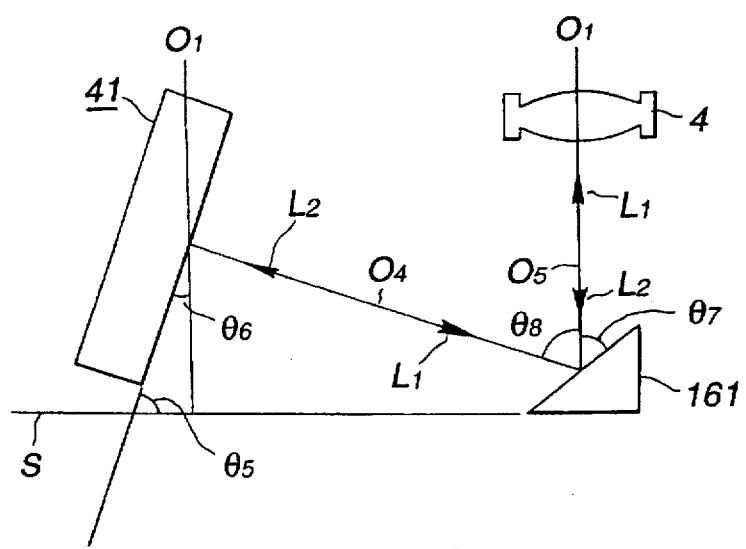
FIG. 11 is a perspective view showing a relation of arrangement between a light-emitting and receiving unit, a light-turning mirror and an objective lens according to the second embodiment of the present invention.

That is, as shown in FIGS. 10 and 11, the light beam $L_1$ emitted from the light-emitting and receiving unit 41 is directly incident upon a single light-turning mirror 161 mounted on a base 102 in a position underneath the objective lens 4 along the optical axis $O_1$ thereof. The light-turning mirror 161 is of an approximately triangular shape similarly to the first light-turning mirror 61 described in the preceding preferred embodiment of the present invention and is provided with a reflecting surface 162 opposed to the optical axis $O_1$ underneath the objective lens 4.

In this case, as mentioned above, the light-emitting and receiving unit 41 is disposed on the base 102 in such an inclined manner that the surface 45a of the semiconductor substrate 45 on which the semiconductor laser 42 and the first and second photodetectors 43 and 44 are provided, makes an inclined angle $\theta_5$ of less than 90 degrees relative to the plane S normal to the optical axis $O_1$ of the objective lens 4. As a result, as shown in FIG. 11, the light beam $L_1$ is emitted from the light-emitting and receiving unit 41 in such a direction that the optical axis of the light beam $L_1$ is inclined relative to the plane S normal to the optical axis $O_1$ of the objective lens 4 at the angle corresponding to the angle $\theta_6$ at which the light-emitting and receiving unit 41 is slant relative to the optical axis $O_1$ of the objective lens 4. In order to introduce the light beam $L_1$ into the objective lens 4 in the form of a light ray parallel with the optical axis of the objective lens 4, the light-turning mirror 161 is mounted on the base 102 such that a reflecting surface 162 thereof is disposed at an inclined angle $\theta_7$, which is equal to 45 degrees plus $½·\theta_6$, relative to the optical axis $O_1$ of the objective lens 4.

As mentioned above, in accordance with the present invention, the light-emitting and receiving unit 41 is mounted on the base 102 so as to incline at the angle $\theta_5$ relative to the plane S normal to the optical axis $O_1$ of the objective lens 4. Further, the light beam $L_1$, which is emitted from the semiconductor laser 42 of the light-emitting and receiving unit 41 at a right angle relative to the surface 45a of the semiconductor substrate 45, is reflected on the reflecting surface 162 of the light-turning mirror 161 in the direction parallel with the optical axis $O_1$ of the objective lens 4. Consequently, the common optical axis $O_4$ of the light beam $L_1$ and the returning light $L_2$ which proceed in an area between the light-emitting and receiving unit 41 and the reflecting surface 162 of the light-turning mirror 161 makes an angle $\theta_8$ of less than 90 degrees (90−$\theta_6$) with respect to the common optical axis $O_5$ of the light beam $L_1$ and the returning light $L_2$ which proceed in an area between the reflecting surface 162 of the light-turning mirror 161 and the objective lens 4.

As shown in FIG. 10, in the optical pick-up device according to the latter preferred embodiment of the present invention, the base 102 is provided, at the side where the stationary member 8 of the objective lens driving device 3 is mounted, with a pair of guide blocks 131 and 132 which is supported on the linear guide shaft 1. Further, the base 102 is provided, at the opposite side where the objective lens 4 of the objective lens-driving device 3 is disposed, with a guide support member 133 having an U-shape in section and engaging with the slide guide member 35 provided on the recording and/or reproducing apparatus so as to interpose the slide guide member 35 between flange portions thereof. As also shown in FIG. 10, the light-emitting and receiving unit 41 is mounted on a unit-fitting portion 156 formed on the base 102 on the side where the guide support member 133 is provided, such that its front face fitted with the light-permeable plate 53 is opposed to the base 102. Meanwhile, the unit-fitting portion 156 has a slant mounting surface 156a inclined relative to the bottom of the base 102 at an angle corresponding to the angle $\theta_6$ at which the light-emitting and receiving unit 41 is inclined relative to the optical axis $O_1$ of the objective lens 4.

Thus, in the optical pick-up device according to the latter preferred embodiment of the present invention, the light-emitting and receiving unit 41 in which the semiconductor laser 42 and the first and second photodetectors 43 and 44 are integrally incorporated are also mounted on the base 102 so as to be inclined relative to the optical axis $O_1$ of the objective lens 4. As a result, an installation height of the light-emitting and receiving unit 41 is reduced whereby the production of the recording and/or reproducing apparatus having a small thickness can be realized.

Incidentally, since the objective lens-driving device 3 used in the latter preferred embodiment of the present invention is the same as that used in the former preferred embodiment described above, the like parts are therefore indicated by like numerals and the detailed explanation thereof is omitted here.

In the optical pick-up device according to each of the above-mentioned preferred embodiments of the present invention, the objective lens-driving device used therein has such a structure that the lens holder is supported by a plurality of narrow wire-like resilient support members in an overhanging manner. However, the objective lens driving device used in the present invention is not limited to such a particular configuration. For instance, in the present invention, there may be suitably used the objective lens-driving device of a type in which the objective lens is mounted at an off-center position of the lens holder, which is rotatable around a supporting shaft and slidable in the axial direction of the shaft, so that the objective lens is movable in both the focusing and tracking directions upon the rotating and axially sliding movements of the lens holder.

Industrial Applicability

In the optical pick-up device according to the present invention, since the light-emitting and receiving unit integrally incorporating the semiconductor laser as a light-emitting element and photodetectors as a light-receiving element is so disposed as to incline relative to the optical axis of the objective lens, an installation height of the light-emitting and receiving unit is reduced whereby the production of the device having a small thickness can be realized.

Further, in the optical pick-up device according to the present invention, in addition to the inclined arrangement of the light-emitting and receiving unit relative to the optical axis of the objective lens, there is provided such a structure that each of the optical axes of the light beam emitted and the returning light to be detected is deflected twice by using first and second light path-changing members so that it is possible to dispose the light-emitting and receiving unit and the second light path-changing member in a position close or adjacent to the objective lens whereby a compactness of the optical pick-up device can be achieved.

What is claimed is:

1. An optical pick-up device comprising:
    a light-emitting and receiving unit composed of a rectangular substrate, a light-emitting element and a light-receiving element, said light-emitting and light-receiving elements being provided on one side surface of the substrate;
    an objective lens for focusing a light beam emitted from said light-emitting element at a point on an optical axis thereof; and
    a light path-changing means for directing said light beam emitted from the light-emitting element to said objective lens and directing an incident light entering through said objective lens to said light-receiving element;
    wherein said light-emitting and receiving unit is disposed such that said surface of the rectangular substrate is inclined relative to the optical axis of said objective lens.

2. The optical pick-up device according to claim 1, wherein said light path-changing means includes a first light path-changing member disposed underneath said objective lens along the optical axis thereof, and a second light path-changing member for changing a light path of the light beam emitted from said light-emitting element such that the optical axis thereof is deflected in the direction normal to an optical axis of the light beam passing between said objective lens and said first light path-changing member.

3. The optical pick-up device according to claim 2, wherein said second light path-changing member is located at a position along the light path between said light-emitting and receiving unit and the first light path-changing member such that the optical axis of the light beam passing between said light-emitting and receiving unit and said second light path-changing member makes a right angle (90 degrees) relative to the optical axis of the light beam passing between said first and second light path-changing members.

4. The optical pick-up device according to claim 1, wherein a longitudinal peripheral side of said rectangular substrate extends in the direction approximately normal to the optical axis of said objective lens.

5. The optical pick-up device according to claim 1, wherein said light-emitting and receiving unit is so disposed that a longitudinal side of said rectangular substrate extends in the direction approximately normal to the optical axis of said objective lens.

6. An optical pick-up device comprising:

a light-emitting and receiving unit composed of a rectangular substrate, a light-emitting element and a light-receiving element, said light-emitting and light-receiving elements being provided on one side surface of the substrate;

an objective lens for focusing a light beam emitted from said light-emitting element at a point on an optical axis thereof; and a light path-changing means for directing said light beam emitted from the light-emitting element to said objective lens and directing an incident light entering through said objective lens to said light-receiving element;

wherein said light-emitting and receiving unit is so disposed that said surface of the rectangular substrate is inclined relative to the optical axis of said objective lens;

wherein said light path-changing means includes a first light path-changing member disposed underneath said objective lens along the optical axis thereof, and a second light path-changing member for changing a light path of the light beam emitted from said light-emitting element such that the optical axis thereof is deflected in the direction normal to an optical axis of the light beam passing between said objective lens and said first light path-changing member; and further wherein said second light path-changing member includes a reflecting surface on which the light beam emitted from said light-emitting element and a light beam coming from said first light path-changing member are reflected, and said reflecting surface of the second light path-changing member is so disposed as to be inclined at such an angle that the light beam emitted from said light-emitting element is deflected in the direction normal to the optical axis of the light beam passing between said objective lens and said first light path-changing member.

7. An optical pick-up device comprising:

a light-emitting and receiving unit composed of a rectangular substrate, a light-emitting element and a light-receiving element, said light-emitting and light-receiving elements being provided on one side surface of the substrate;

an objective lens for focusing a light beam emitted from said light-emitting element at a point on an optical axis thereof; and a light path-changing means for directing said light beam emitted from the light-emitting element to said objective lens and directing an incident light entering through said objective lens to said light-receiving element;

wherein said light-emitting and receiving unit is disposed such that said surface of the rectangular substrate is inclined relative to the optical axis of said objective lens; and wherein said light path-changing means is provided with an optical means disposed underneath said objective lens along the optical axis thereof and having a reflecting surface to change the light path of the light beam emitted from said light-emitting element and introduce an incident light beam entering through said objective lens into said light-receiving element, and the optical axis of the light beam passing between said light-emitting and receiving unit and said reflecting surface makes an angle of less than 90 degrees relative to the optical axis of the light beam passing through said objective lens and said reflecting surface.

8. An optical pick-up device comprising: a light-emitting and receiving unit composed of a rectangular substrate, a light-emitting element and a light-receiving element, said light-emitting and light-receiving elements being provided on one side surface of the substrate;

an objective lens for focusing a light beam emitted from said light-emitting element at a point on an optical axis thereof; and a light path-changing means for directing said light beam emitted from the light-emitting element to said objective lens and directing an incident light entering through said objective lens to said light-receiving element;

wherein said light-emitting and receiving unit is disposed such that said surface of the rectangular substrate is inclined relative to the optical axis of said objective lens; and wherein said light path-changing means is provided with a reflecting surface on which the light beam incident on said light path-changing means is reflected, said reflecting surface is inclined at an angle of less than 45 degrees relative to a plane normal to the optical axis of said objective lens.

9. An optical pick-up device comprising:

a light-emitting and receiving unit composed of a substrate, a light-emitting element and a light-receiving element, said light-emitting and light-receiving elements being provided on either one of opposite surfaces of the substrate;

an objective lens for focusing a light beam emitted from said light-emitting element at a point on an optical axis thereof; and a light path-changing means for changing a light path of said light beam emitted from the light-emitting element and introducing an incident light entering through said objective lens into said light-receiving element;

wherein an optical axis of the light beam passing between said light-emitting and receiving unit and said light path-changing means makes an angle of less than 90 degrees relative to an optical axis of the light beam passing between said objective lens and said light path-changing means.

10. The optical pick-up device according to claim 9, wherein said light path-changing means includes a first light path-changing member disposed underneath said objective lens along the optical axis thereof, and a second light path-changing member for changing a light path of the light beam emitted from said light-emitting element such that the optical axis thereof is deflected in the direction normal to the optical axis of the light beam passing between said objective lens and said first light path-changing member.

11. The optical pick-up device according to claim 10, wherein said second light path-changing member is located at a position along a light path between said light-emitting and receiving unit and said first light path-changing member such that the optical axis of the light beam passing between said light-emitting and receiving unit and said second light path-changing member makes a right angle (90 degrees) relative to the optical axis of the light beam passing between said first and second light path-changing members.

12. The optical pick-up device according to claim 9, wherein a longitudinal peripheral side of said rectangular substrate extends in the direction approximately normal to the optical axis of said objective lens.

13. The optical pick-up device according to claim 9, wherein said light-emitting and receiving unit is so disposed that a longitudinal peripheral side of said rectangular substrate extends in the direction approximately normal to the optical axis of said objective lens.

14. An optical pick-up device comprising:
  a light-emitting and receiving unit composed of a substrate, a light-emitting element and a light-receiving element, said light-emitting and light-receiving elements being provided on either one of opposite surfaces of the substrate;
  an objective lens for focusing a light beam emitted from said light-emitting element at a point on an optical axis thereof; and
  a light path-changing means for changing a light path of said light beam emitted from the light-emitting element and introducing an incident light entering through said objective lens into said light-receiving element;
    wherein an optical axis of the light beam passing between said light-emitting and receiving unit and said light path-changing means makes an angle of less than 90 degrees relative to an optical axis of the light beam passing between said objective lens and said light path-changing means;
    wherein said light path-changing means includes a first light path-changing member disposed underneath said objective lens along the optical axis thereof, and a second light path-changing member for changing a light path of the light beam emitted from said light-emitting element such that the optical axis thereof is deflected in the direction normal to the optical axis of the light beam passing between said objective lens and said first light path-changing member; and further
    wherein said second light path-changing member includes a reflecting surface on which the light beam emitted from said light-emitting element and a light beam coming from said first light path-changing member are reflected, and said reflecting surface of the second light path-changing member is so disposed as to be inclined at an angle capable of deflecting the light beam emitted from said light-emitting element in the direction normal to the optical axis of the light beam passing between said objective lens and said first light path-changing member.

15. An optical pick-up device comprising:
  a light-emitting and receiving unit composed of a substrate, a light-emitting element and a light-receiving element, said light-emitting and light-receiving elements being provided on either one of opposite surfaces of the substrate;
  an objective lens for focusing a light beam emitted from said light-emitting element at a point on an optical axis thereof; and
  a light path-changing means for changing a light path of said light beam emitted from the light-emitting element and introducing an incident light entering through said objective lens into said light-receiving element;
    wherein an optical axis of the light beam passing between said light-emitting and receiving unit and said light path-changing means makes an angle of less than 90 degrees relative to an optical axis of the light beam passing between said objective lens and said light path-changing means;
    wherein said light path-changing means includes a first light path-changing member disposed underneath said objective lens along the optical axis thereof, and a second light path-changing member for changing a light path of the light beam emitted from said light-emitting element such that the optical axis thereof is deflected in the direction normal to the optical axis of the light beam passing between said objective lens and said first light path-changing member; and further
    wherein said second light path-changing member includes a reflecting surface on which the light beam emitted from said light-emitting element and a light beam coming from said first light path-changing member are reflected, and said reflecting surface of the second light path-changing member is so disposed as to be inclined at an angle capable of deflecting the light beam emitted from said light-emitting element in the direction normal to the optical axis of the light beam passing between said objective lens and said first light path-changing member.

16. An optical pick-up device comprising:
  a light-emitting and receiving unit composed of a substrate, a light-emitting element and a light-receiving element, said light-emitting and light-receiving elements being provided on either one of opposite surfaces of the substrate;
  an objective lens for focusing a light beam emitted from said light-emitting element at a point on an optical axis thereof; and
  a light path-changing means for changing a light path of said light beam emitted from the light-emitting element and introducing an incident light entering through said objective lens into said light-receiving element;
    wherein an optical axis of the light beam passing between said light-emitting and receiving unit and said light path-changing means makes an angle of less than 90 degrees relative to an optical axis of the light beam passing between said objective lens and said light path-changing means; and
    wherein said light path-changing means is provided with an optical means disposed underneath said objective lens along the optical axis thereof and having a reflecting surface to change a light path of the light beam emitted from said light-emitting element and introduce an incident light beam entering through said objective lens into said light-receiving element, and an optical axis of the light beam passing between said light-emitting and receiving unit and said reflecting surface makes an angle of less than 90 degrees relative to an optical axis of the light beam passing through said objective lens and said reflecting surface.

17. An optical pick-up device comprising:
a light-emitting and receiving unit composed of a rectangular substrate, a light-emitting element and a light-receiving element, said light-emitting and light-receiving elements being arranged in line on either one of opposite surfaces of the substrate;
an objective lens for focusing a light beam emitted from said light-emitting element at a point on an optical axis thereof;
a supporting means for supporting said objective lens to move in the direction parallel with an optical axis of said objective lens and in the direction of a plane normal to the optical axis of said objective lens;
a light path-changing means for directing said light beam emitted from the light-emitting element toward said objective lens and directing an incident light entering through said objective lens toward said light-receiving element; and
a base to which said light-emitting and receiving unit, said supporting means and said light path-changing means are mounted and which is provided with a guidable support member engaging with a linear guide means; wherein said light-emitting and receiving unit is disposed on said base such that one of a pair of opposed longitudinal peripheral sides of said rectangular substrate extends in the direction approximately normal to the optical axis of said objective lens, and a surface of said rectangular substrate is inclined relative to the optical axis of said objective lens.

18. The optical pick-up device according to claim 17, wherein said guidable support member is disposed on said base so as to extend in the direction approximately normal to the supporting direction of said objective lens by said supporting means.

19. The optical pick-up device according to claim 17, wherein said light path-changing means includes a first light path-changing member disposed underneath said objective lens along the optical axis thereof, and a second light path-changing member for changing a light path of the light beam emitted from said light-emitting element such that an optical axis thereof is deflected in the direction normal to an optical axis of the light beam passing between said objective lens and said first light path-changing member.

20. The optical pick-up device according to claim 19, wherein said supporting means is provided with a reference portion for movement, which is located at a position spaced apart from the optical axis of said objective lens in the direction normal to said linear guide means, and said objective lens is supported so as to be movable in the directions parallel with the optical axis of said objective lens and in the direction of a plane normal to the optical axis of said objective lens.

21. The optical pick-up device according to claim 19, wherein said second light path-changing member is located in the proximity of said guidable support member.

22. An optical pick-up device comprising:
a light-emitting and receiving unit composed of a substrate, a light-emitting element and a light-receiving element, said light-emitting and light-receiving elements being provided on either one of opposite surfaces of the substrate;
an objective lens for focusing a light beam emitted from said light-emitting element at a point on an optical axis thereof; and a light path-changing means for changing a light path of said light beam emitted from the light-emitting element and introducing an incident light entering through said objective lens into said light-receiving element;
wherein an optical axis of the light beam passing between said light-emitting and receiving unit and said light path-changing means makes an angle of less than 90 degrees relative to an optical axis of the light beam passing between said objective lens and said light path-changing means; and
wherein said light path-changing means is provided with a reflecting surface on which the light beam incident on said light path-changing means is reflected and said reflecting surface is inclined at an angle of less than 45 degrees relative to a plane normal to the optical axis of said objective lens.

23. An optical pick-up device comprising:
a light-emitting and receiving unit composed of a rectangular substrate, a light-emitting element and a light-receiving element, said light-emitting and light-receiving elements being arranged in line on either one of opposite surfaces of the substrate;
an objective lens for focusing a light beam emitted from said light-emitting element at a point on an optical axis thereof;
a supporting means for supporting said objective lens to move in the direction parallel with an optical axis of said objective lens and in the direction of a plane normal to the optical axis of said objective lens;
a light path-changing means for directing said light beam emitted from the light-emitting element toward said objective lens and directing an incident light entering through said objective lens toward said light-receiving element; and
a base to which said light-emitting and receiving unit, said supporting means and said light path-changing means are mounted and which is provided with a guidable support member engaging with a linear guide means, wherein said light-emitting and receiving unit is so disposed on said base that one of a pair of opposed longitudinal peripheral sides of said rectangular substrate extends in the direction approximately normal to the optical axis of said objective lens, and a surface of said rectangular substrate is inclined relative to the optical axis of said objective lens;
wherein said light path-changing means includes a first light path-changing member disposed underneath said objective lens along the optical axis thereof, and a second light path-changing member for changing a light path of the light beam emitted from said light-emitting element such that an optical axis thereof is deflected in the direction normal to an optical axis of the light beam passing between said objective lens and said first light path-changing member; and
wherein said second light path-changing member is located at a position along a light path between said light-emitting and receiving unit and said first light path-changing member such that an optical axis of the light beam passing between said light-emitting and receiving unit and said second light path-changing member makes a right angle (90 degrees) relative to an optical axis of the light beam passing between said first and second light path-changing members.

* * * * *